G. A. JASPER.
Apparatus for Refining Raw Sugar.

No. 198,944. Patented Jan. 8, 1878.

WITNESSES: INVENTOR.

UNITED STATES PATENT OFFICE.

GUSTAVUS A. JASPER, OF BOSTON, MASSACHUSETTS.

IMPROVEMENT IN APPARATUS FOR REFINING RAW SUGARS.

Specification forming part of Letters Patent No. 198,944, dated January 8, 1878; application filed September 6, 1877.

*To all whom it may concern:*

Be it known that I, GUSTAVUS A. JASPER, of Boston, in the State of Massachusetts, have invented a new and useful Improvement in Apparatus for Refining Raw Sugars, of which the following is a specification:

In a patent of even date herewith I have described and claimed a new process of refining raw sugar by dissolving it in warm water to an exceedingly thin liquor of low temperature, filtering the thin liquor, and evaporating it to the density of thick liquor, and then refiltering and crystallizing the thick liquor.

The invention which I wish to secure to myself in this patent consists in a combination of apparatus for working the aforesaid process.

Figure 1:
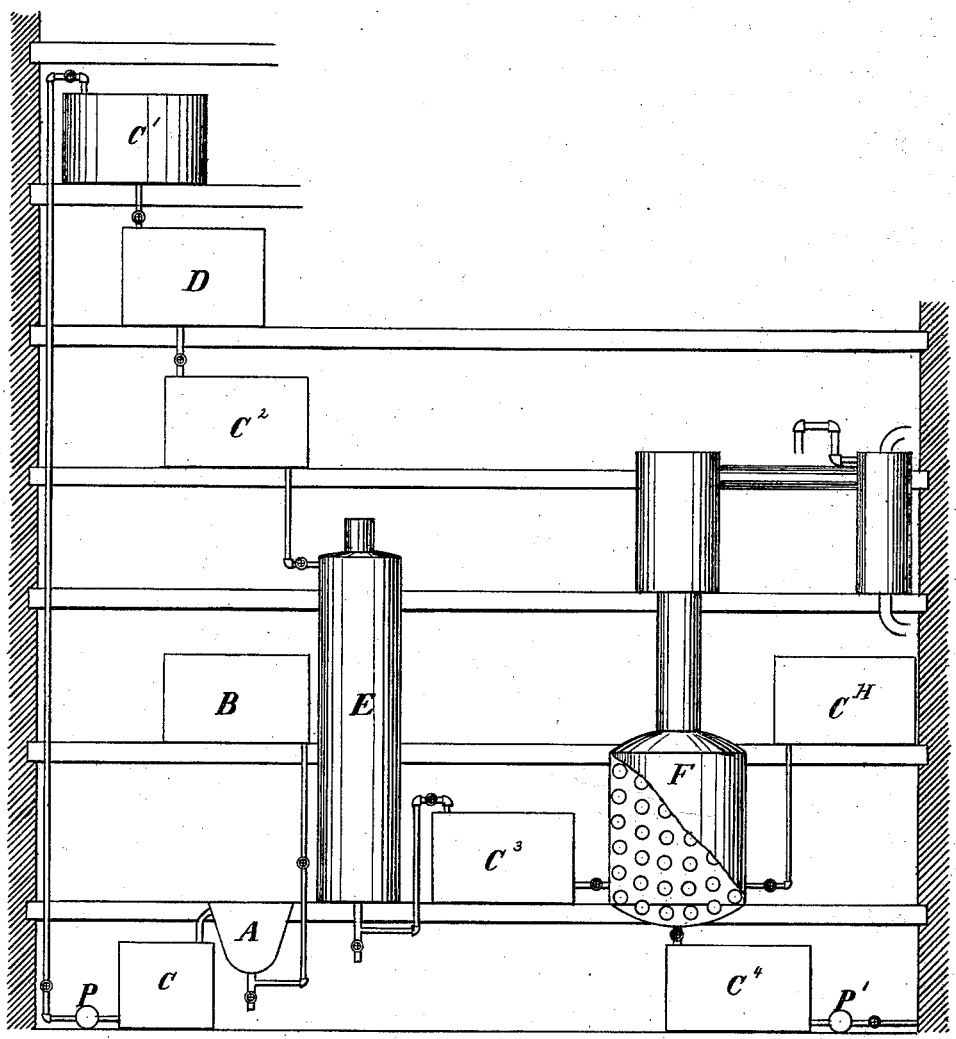
Figure 2:
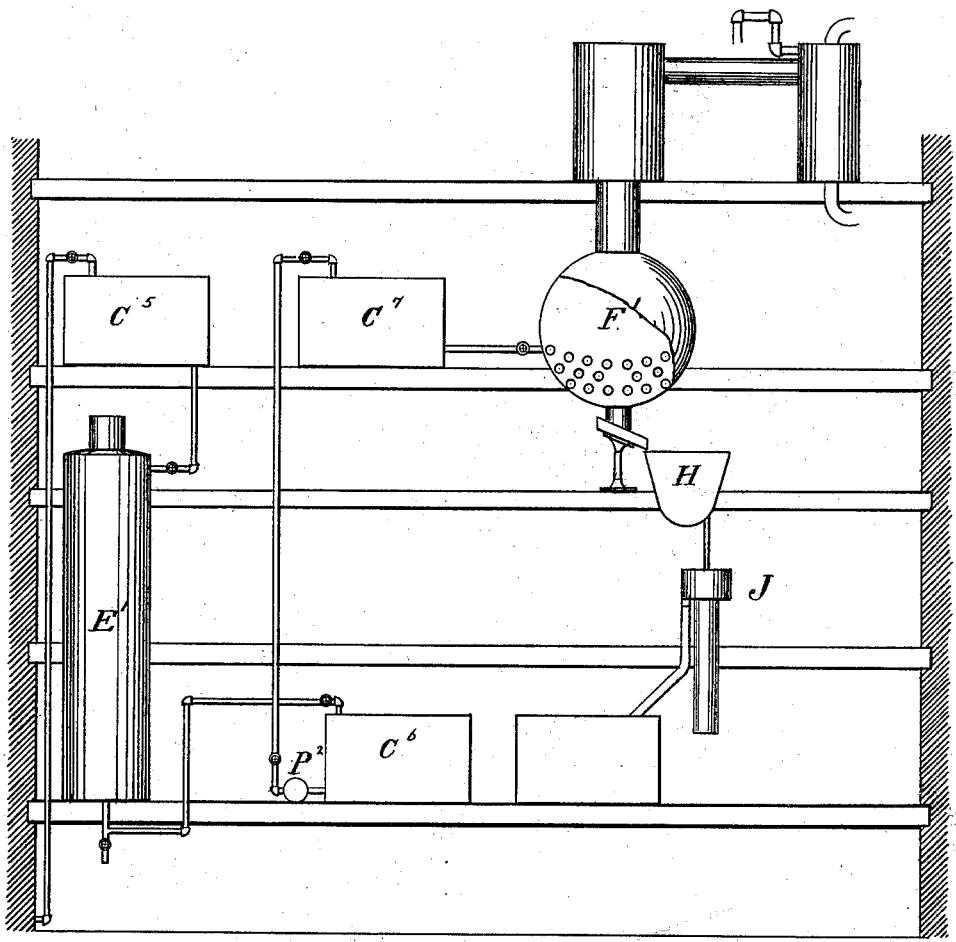

In the drawings, Figures 1 and 2, taken together, show my entire apparatus, the drawing, for convenience, being broken into two figures, of which Fig. 1, by itself, shows so much of the apparatus as is used in treating the sugar from the time when it is first melted to a thin liquor till it is evaporated to a thick liquor, while Fig. 2 shows an ordinary apparatus for filtering and crystallizing thick liquor, together with centrifugal and other common mechanism of a refinery. Parts of the figures, representing, respectively, the evaporator and vacuum-pan, are broken to show approximately the comparative amount of steam-pipe used, the evaporating-pan having a large amount of steam-pipe, in order that the evaporation of the thin liquor may go on rapidly, and the vacuum-pan having few steam-pipes, in order that the boiling by which crystals are formed from the thick liquor may be slow.

A is a mixer; B, a warm-water tank; C C$^1$ C$^2$ C$^3$, &c., and C$^H$, are tanks, for purposes to be described. D is the bag-filter chest. E and E$'$ are charcoal-filters; F, an evaporating-pan; F$'$, a vacuum-pan; H, a second mixer; J, a centrifugal; and P P$^1$ P$^2$ are pumps. Necessary pipes and valves are also shown; but no further description is necessary, since they are of ordinary construction, and their mode of operation is obvious.

The raw sugar is dumped into the mixer A, where it is stirred by contrivance not shown, and dissolved by warm water flowing into the mixer from the tank B, the water being of the proper temperature and of sufficient quantity to bring the liquor, which is constantly flowing over into the tank C, to a density of from about 10° to 15° Baumé, and to a low temperature, as near as may be to 120° Fahrenheit. The warm-water tank B is provided with means for bringing the water to and maintaining it at the required temperature. From the overflow-tank C the thin liquor is pumped up to a regulating-tank, C$^1$, at the top of the house. In this regulating-tank the liquor is made of uniform density and temperature—that is, as near as may be, 10° to 15° Baumé and 120° Fahrenheit—and for that purpose the tank is provided with heating apparatus and inducting water-pipes, hot and cold. In the tank C$^1$ the liquor is treated with lime, if necessary. From the tank C$^1$ the liquor is passed through the bag-filters in the chest D to the tank C$^2$, and thence through the charcoal-filters E to the tank C$^3$, as shown. From the tank C$^3$ charges are successively drawn into the evaporator F, the latter being provided with a condenser, and also with a large amount of heating-surface or steam-pipe, as shown, so that at a low temperature it can evaporate a charge to the density of from about 25° to 28° Baumé while the tank C$^3$ is filling up from the filters. The thin liquor accordingly is in a constant state of agitation, does not accumulate, and does not ferment.

A chemical tank, C$^H$, is also connected with the evaporator, as shown, and from it I introduce into the evaporator such chemicals as are necessary for removing the excess of lime, or as may be useful for other purposes, and this may be done while the evaporation goes on. From the evaporating-pan liquor is drawn into the tank C$^4$ of the density of from 25° to 28° Baumé, but still of a low temperature. From the tank C$^4$ the thick liquor is pumped by the pump P$^1$ to the tank C$^5$, whence, in the ordinary manner, as shown, it passes through filter E$'$ and tank C$^6$ to tank C$^7$, whence it is drawn to the vacuum-pan in charges, as required. The crystallized sugar drawn from the vacuum-pan passes through the second mixer, the centrifugals, &c., in the ordinary manner.

I have shown the chemical tank C$^H$ as connected with the evaporating-pan. It might be connected with the vacuum-pan; or two might be used, one with the evaporator and one with the vacuum pan, and in some cases none will be required.

The apparatus above described for carrying out the process hereinbefore mentioned consists of a combination of two elements, viz., apparatus for dissolving raw sugar and preparing thick liquor and apparatus for completing the process of producing refined sugar; but it is evident that by increasing the height of the building the two members of the combination may be so connected with each other that the office of the pump $P^1$ and tank $C^5$ shown will be performed by the force of gravity alone, and that in like manner the number and situation of pumps, pipes, and receiving and conducting tanks in either member of the combination may be varied without departing from my invention.

Having thus described the apparatus I use for refining raw sugars according to my improved process aforesaid, I claim—

Apparatus for dissolving raw sugar and preparing thick liquor, consisting of a mixer, warm-water and equalizing tanks, filters, evaporating-pan, and necessary receiving and conducting tanks, pipes, and pumps, in combination with apparatus for completing the process of producing refined sugar, consisting of a filter, vacuum-pan, mixer, centrifugal, and necessary receiving and conducting tanks, pipes, and pumps, substantially as described.

GUSTAVUS A. JASPER.

Witnesses:
G. W. BOYNTON,
WILLIAM W. SWAN.